(12) United States Patent
Kim

(10) Patent No.: US 12,231,254 B2
(45) Date of Patent: Feb. 18, 2025

(54) SERVER, TERMINAL DEVICE, AND METHOD FOR HOME APPLIANCE MANAGEMENT THEREBY

(71) Applicant: Samsung Electronics Co., Ltd., Suwon-si (KR)

(72) Inventor: Youngsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 17/422,421

(22) PCT Filed: Dec. 6, 2019

(86) PCT No.: PCT/KR2019/017249
§ 371 (c)(1),
(2) Date: Jul. 12, 2021

(87) PCT Pub. No.: WO2020/153600
PCT Pub. Date: Jul. 30, 2020

(65) Prior Publication Data
US 2022/0123956 A1    Apr. 21, 2022

(30) Foreign Application Priority Data

Jan. 23, 2019    (KR) .................... 10-2019-0008883

(51) Int. Cl.
*H04L 12/28*    (2006.01)
(52) U.S. Cl.
CPC ................. *H04L 12/2807* (2013.01)
(58) Field of Classification Search
None
See application file for complete search history.

(56) References Cited

U.S. PATENT DOCUMENTS 7,539,724 B1    5/2009   Callaghan
9,383,746 B2    7/2016   Ha et al.
(Continued)

FOREIGN PATENT DOCUMENTS

CN    101155230 A    4/2008
EP    3016036 A1    5/2016
(Continued)

OTHER PUBLICATIONS

International Search Report dated Mar. 17, 2020 in connection with International Patent Application No. PCT/ KR2019/017249, 2 pages.
(Continued)

*Primary Examiner* — Pamit Kaur

(57) ABSTRACT

A server is disclosed. The disclosed server includes a communication device for performing communication with a home appliance and a terminal device, a memory for storing state information of the home appliance and operation pattern information obtained by analyzing an operation pattern of the home appliance, and a processor for, when a query for the home appliance is received from the terminal device, generating response information in response to the received query, and controlling the communication device to transmit the generated response information to the terminal device, wherein the processor extracts a keyword included in the received query, checks at least one state item corresponding to the extracted keyword, and generates response information by using information corresponding to at least one state item in the state information and the operation pattern information.

9 Claims, 10 Drawing Sheets

(56) References Cited

U.S. PATENT DOCUMENTS

| | | | |
|---|---|---|---|
| 9,772,136 B2 | 9/2017 | Shim et al. | |
| 10,845,079 B1* | 11/2020 | Picardi | F24F 11/64 |
| 2011/0054844 A1 | 3/2011 | Han et al. | |
| 2012/0303323 A1 | 11/2012 | Ha et al. | |
| 2014/0085056 A1 | 3/2014 | Kong | |
| 2015/0348554 A1* | 12/2015 | Orr | G05B 15/02 |
| | | | 704/275 |
| 2016/0127144 A1 | 5/2016 | Takahashi et al. | |
| 2017/0059743 A1 | 3/2017 | Haupt et al. | |
| 2017/0329865 A1* | 11/2017 | Youn | G06F 16/162 |
| 2018/0122376 A1* | 5/2018 | Kojima | G10L 15/22 |

FOREIGN PATENT DOCUMENTS

| | | |
|---|---|---|
| JP | 2002-109017 A | 4/2002 |
| JP | 2003-316669 A | 11/2003 |
| JP | 2015-171210 A | 9/2015 |
| KR | 20-0285132 Y1 | 7/2002 |
| KR | 10-2004-0067151 A | 7/2004 |
| KR | 10-2004-0079449 A | 9/2004 |
| KR | 10-0813395 B1 | 3/2008 |
| KR | 10-2008-0107383 A | 12/2008 |
| KR | 10-1553843 B1 | 9/2015 |
| KR | 10-2016-0006832 A | 1/2016 |
| KR | 10-2016-0147330 A | 12/2016 |
| KR | 10-2017-0060567 A | 6/2017 |
| KR | 10-1772543 B1 | 8/2017 |
| KR | 10-1797946 B1 | 12/2017 |
| KR | 10-2018-0003519 A | 1/2018 |
| KR | 10-2018-0022762 A | 3/2018 |

OTHER PUBLICATIONS

Written Opinion of the International Searching Authority dated Mar. 17, 2020 in connection with International Patent Application No. PCT/KR2019/017249, 4 pages.

Request for the Submission of an Opinion dated Jun. 26, 2024, in connection with Korean Patent Application No. 10-2019-0008883, 16 pages.

Request for the Submission of an Opinion dated Jan. 7, 2025, in connection with Korean Application No. 10-2019-0008883, 16 pages.

* cited by examiner

SERVER, TERMINAL DEVICE, AND METHOD FOR HOME APPLIANCE MANAGEMENT THEREBY

CROSS-REFERENCE TO RELATED APPLICATIONS

This application is a 371 of International Application No. PCT/KR2019/017249 filed on Dec. 6, 2019, which claims priority to Korean Patent Application No. 10-2019-0008883 filed on Jan. 23, 2019, the disclosures of which are herein incorporated by reference in their entirety.

BACKGROUND

1. Field

The disclosure relates to a server, a terminal device, and a method of managing a home appliance thereof. More particularly, the disclosure relates to a server providing answers generated based on state information and operation pattern information of the home appliance to the user's question about the home appliance, a terminal device and a method of managing the home appliance thereof.

2. Description of Related Art

Home appliances perform various functions according to a user's control command. Recently, various systems providing related information are being built such that users can easily understand how to use home appliances, how to resolve errors or the like.

For example, if a user explains a state of home appliances, a service center counselor who explains appropriate actions afterwards, and a system that provides users with how to use and troubleshoot errors through applications that collect and answer frequently asked questions about home appliances.

However, existing systems have to understand the state of home appliances only with the user's explanation, there are problems in that it is difficult for service center counselors to determine appropriate measures, and it is difficult to provide accurate feedback because the application provides consistent answers regardless of the current state of home appliances.

An object of the disclosure is to provide a server that provides an answer generated based on state information and operation pattern information of a home appliance to user inquiries about the home appliance, a terminal device, and a home appliance management method thereof.

SUMMARY

According to an embodiment of the disclosure, a server includes a communication device configured to perform communication with a home appliance and a terminal device, a memory configured to store state information of the home appliance and operation pattern information obtained by analyzing an operation pattern of the home appliance, and a processor configured to, based on a query for the home appliance being received from the terminal device, generate response information in response to the received query and control the communication device to transmit the generated response information to the terminal device, wherein the processor is configured to extract a keyword included in the received query, check at least one state item corresponding to the extracted keyword, and generate the response information by using information corresponding to the at least one state item in the state information and the operation pattern information.

According to an embodiment of the disclosure, a terminal device includes a communication device configured to perform communication with a server, a display configured to display a user interface window that receives a text-based query for home appliances from a user, and a processor configured to control the communication device to transmit the received query to the server, and control the display to, based on response information in response to the transmitted query being received from the server, display the received response information through the user interface window, wherein the received response information is response information generated by using information corresponding to at least one state item corresponding to a keyword included in the query in state information and operation pattern information of the home appliance.

According to an embodiment of the disclosure, a method for managing home appliances includes storing state information of the home appliance and operation pattern information obtained by analyzing an operation pattern of the home appliance, receiving a query for the home appliance from a terminal device, generating response information in response to the received query, and transmitting the generated response information to the terminal device, wherein the generating the response information includes extracting a keyword included in the received query checking at least one state item corresponding to the extracted keyword, and generating the response information by using information corresponding to the at least one state item in the state information and the operation pattern information.

According to an embodiment of the disclosure, a method of managing home appliances includes receiving a text-based query for home appliances from a user, transmitting the received query to the server, receiving response information in response to the transmitted query from the server, and displaying the received response information, wherein the received response information may be response information generated by using information corresponding to at least one state item corresponding to a keyword included in the query in the state information and the operation pattern information.

According to an embodiment of the disclosure, a recording medium storing a program for executing a voice recognition method of home appliances includes storing state information of the home appliance and operation pattern information obtained by analyzing an operation pattern of the home appliance, receiving a query for the home appliance from a terminal device, generating response information in response to the received query, and transmitting the generated response information to the terminal device, and wherein the generating the response information includes extracting a keyword included in the received query, checking at least one state item corresponding to the extracted keyword, and generating the response information by using information corresponding to the at least one state item in the state information and the operation pattern information.

According to an embodiment of the disclosure, the recording medium storing a program for executing a voice recognition method of home appliances includes receiving a text-based query for home appliances from the user, transmitting the received query to the server, receiving response information in response to the transmitted query from the server, and displaying the received response information, wherein the received response information may be response information generated by using information corresponding to at least one state item corresponding to a keyword included in the query in the state information and the operation pattern information.

DETAILED DESCRIPTION

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The example embodiments of the disclosure will be described in greater detail below in a manner that will be understood by one of ordinary skill in the art. However, exemplary embodiments may be realized in a variety of different configurations, and not limited to descriptions provided herein. In addition, parts not related to the description are omitted in order to clearly describe the disclosure.

Hereinafter, exemplary embodiments will be described in detail with reference to accompanying drawings.

Figure 1:
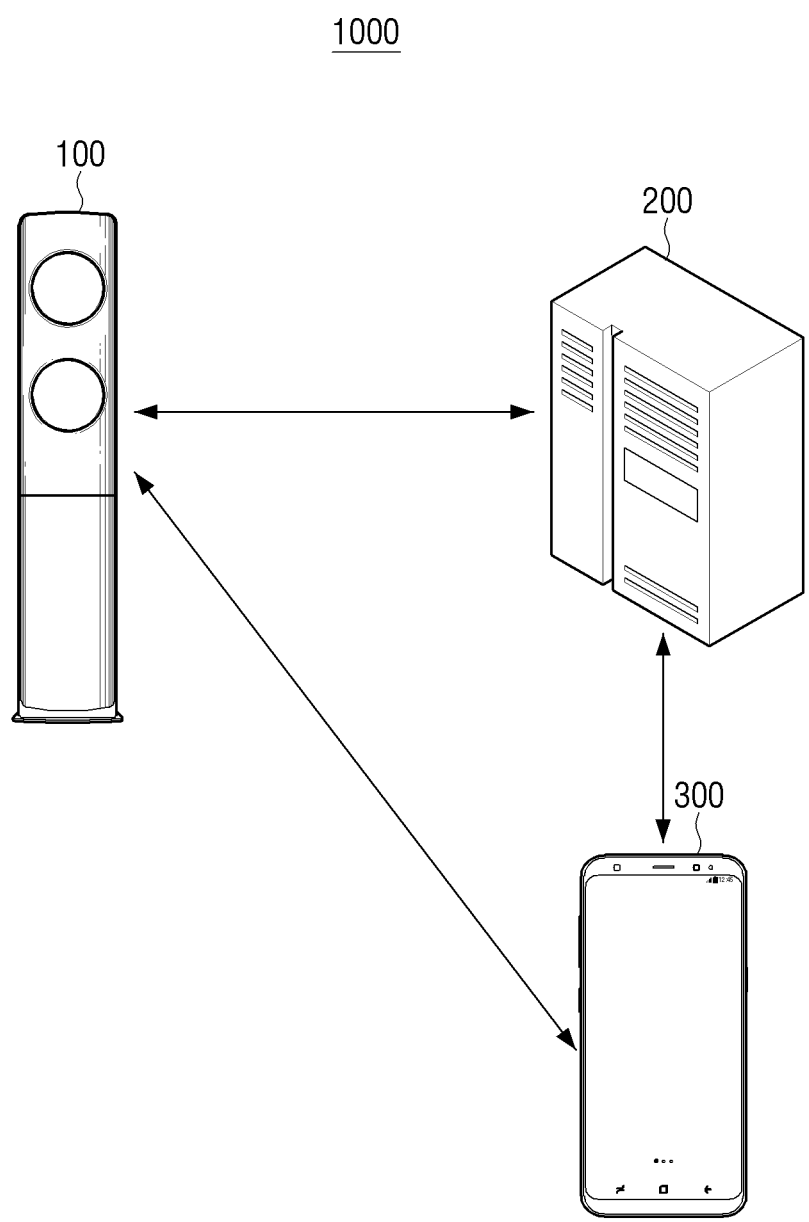
FIG. 1 is a view illustrating a home appliance management system according to an embodiment.

FIG. 1 is a view illustrating a home appliance management system according to an embodiment of the disclosure.

Referring to FIG. 1, a home appliance management system 1000 a home appliance 100, a server 200, and a terminal device 300.

The home appliance 100 is an electric machine device used at home, and may be a robot cleaner, a vacuum cleaner, an electric range, a gas range, a radio wave oven, a range hood, a washing machine, a dryer, a refrigerator, a dishwasher, an air conditioner, or the like.

The home appliance 100 may communicate with the server 200 or the terminal device 300. The home appliance 100 may transmit state information to the server 200. Here, as information that can check the overall state of the home appliance 100, it may include device information, operation history information, set value information, sensing information of sensors in the home appliance 100, and system parameter information, but is not limited thereto.

In addition, the server 200 may generate operation pattern information obtained by analyzing the operation pattern of the home appliance 100 by using the state information received from the home appliance 100. A specific operation of generating operation pattern information will be described below with reference to FIG. 2.

In addition, the server 200 may store state information and operation pattern information.

In addition, the server 200 may receive a query for the home appliance 100 from the terminal device 300. In addition, the query may include text input by the user through an input device of the terminal device 300 or a display displaying a user interface window.

Here, the text input by the user may be a text corresponding to a question or problem regarding the home appliance 100 by the user. For example, the text entered by the user may be "weak cooling".

In addition, the server 200 may generate response information corresponding to the received query. Specifically, the server 200 may analyze the text included in the received query, and generate response information including information desired by the user by using a result of analyzing the text, the state information and operation pattern information of the home appliance 100.

The response information may include specific information on a current state of the home appliance 100 that the user wants to ask through a query. In addition, the response information may include information on an error currently occurring in the home appliance 100 or information on how to resolve the error. In addition, the response information may include usage information of the home appliance 100 or the like. The response information may include various information in addition to this.

More specifically, the server 200 may extract a keyword by using text included in the received query and check at least one state item corresponding to the extracted keyword.

In addition, the server 200 may identify the current state of the home appliance 100 based on information corresponding to the identified state item in the state information and operation pattern information of the home appliance 100, and generate response information including specific information on the current state of the home appliance 100 that the user wants to ask through the query.

For example, if the home appliance 100 is air conditioner, the server 200 may receive a query including text such as "weak cooling". The server 200 may extract a keyword of "cooling" and "weak" from the text.

When a cooling function of the air conditioner is weak, there are cases in which the amount of refrigerant in the air conditioner is insufficient, an external temperature is very high, or a set temperature is high. Therefore, a state item corresponding to "cooling" and "weak" may be set as the amount of refrigerant, external temperature, set temperature, or the like. In addition, the server 200 may check information on the amount of refrigerant, external temperature information, and set temperature information of the home appliance 100 corresponding to the identified item, and the server may check whether the amount of refrigerant in the home appliance 100 is insufficient, whether the external temperature of the home appliance 100 is very high, or whether the set temperature of the home appliance 100 is high, based on the checked information of the home appliance 100. In addition, when it is checked that the amount of refrigerant in the home appliance 100 is insufficient, the server 200 may generate response information including text information such as "the amount of refrigerant is insufficient".

Meanwhile, a specific operation of the server 200 generating response information using state information and operation pattern information of the home appliance will be described below with reference to FIG. 3.

In addition, the server 200 may transmit the generated response information to the terminal device 300.

The terminal device 300 may receive a text-based query for the home appliance 100 from the user through a user interface window of the display. Specifically, a chat application installed in the terminal device 300 may be displayed on the user interface window, and a query for the home appliance 100 may be inputted based on text from the user through the chat application.

In addition, the input query may be transmitted to the server 200. In this case, device information about the home appliance 100 may be transmitted to the server 200 together with the query.

In addition, the terminal device 300 may receive response information corresponding to the query transmitted from the server. In addition, the terminal device 300 may display the received response information through the user interface window. Specifically, the terminal device 300 may display response information received from the server 200 through the chat application displayed on the user interface window in a text, image, or video format.

For example, the terminal device 300 may display text information such as "the amount of refrigerant is insufficient" included in the response information received from the server 200 through the chat application.

As such, when the user inputs an inquiry about a home appliance through the chat program installed in the terminal device, the home appliance management system 1000 may generate response information corresponding to the inquiry based on the state information and operation pattern information of the home appliance to display it through the terminal device, such that even though the user has not clearly confirmed the current state of the home appliance, it has an effect of providing feedback appropriate for the current state of the home appliance.

Figure 2:
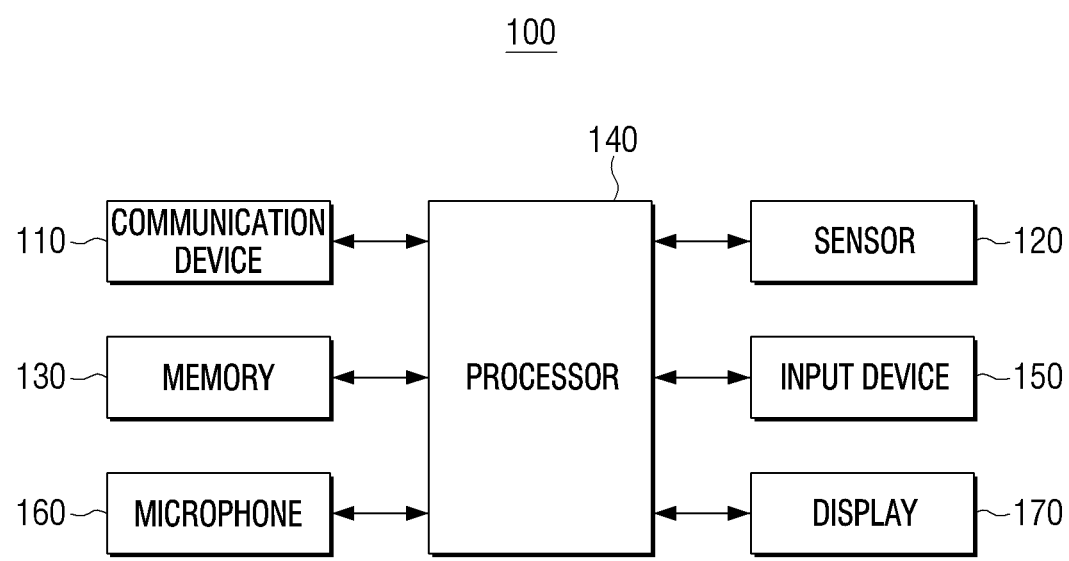
FIG. 2 is a block diagram illustrating a configuration of a home appliance according to an embodiment.

FIG. 2 is a block diagram illustrating a configuration of a home appliance according to an embodiment of the disclosure.

Referring to FIG. 2, the home appliance 100 may be composed of a communication device 110, a sensor 120, a memory 130, a processor 140, an input device 150, a microphone 160, and a display 170.

The communication device 110 is connected to an external device (not shown) and communicates with an external device using a plurality of communication methods.

Specifically, the communication device 110 may communicate with an external device using a communication method using a mobile communication network. Here, the mobile communication network may correspond to not only 3G, LTE, and 5G, but also low power wireless network (LPWN) and low power wide area network (LPWAN) such as NB-IoT, LoRa, SigFox, and LTE-CAT1. In addition, the communication device 110 may perform communication using a communication method using a wireless LAN such as Wi-Fi 802.11a/b/g/n as well as a wired local area network (LAN). In addition to this, the communication device 110 may communicate with an external device using a communication method such as NFC and Bluetooth.

In addition, the communication device 110 may communicate with the terminal device 300 or the server 200 to transmit and receive various types of information. Specifically, the communication device 110 may transmit state information of the home appliance 100 by performing communication with the server 200.

Here, the state information means information that can check the overall state of the home appliance 100. Specifically, the state information may include operation history information including information such as an operation start time, an operation end time, an operation duration time, or the like for each function of the home appliance 100.

In addition, the state information may include set value information for the home appliance 100. For example, when the home appliance 100 is an air conditioner, the state information may include information on the user's set value for a cooling function of the air conditioner.

In addition, the state information may include sensing information of the sensor 120 in the home appliance 100. For example, when the home appliance 100 is a refrigerator and the sensor 120 is a temperature sensor attached to a cold storage of the refrigerator, the state information may include temperature information of the cold storage sensed by the temperature sensor. Meanwhile, the sensing information of the sensor 120 in the home appliance 100 is not limited to thereto, and since various sensors may be provided according to the type of the home appliance 100, the types of sensing information of the sensor 120 may also vary.

The state information may include device information of the home appliance 100. Here, the device information of the home appliance 100 is unique information that can be used to specify the corresponding home appliance. For example, it may include a unique serial number or a universally unique identifier (UUID), but is not limited thereto.

In addition, the state information may include system parameter information, and is not limited to the examples described above.

In addition, the communication device 110 may receive a request for state information from the server 200. In addition, the communication device 110 may transmit state information to the server 200 in response to the received request.

The sensor 120 may detect information related to the home appliance 100. Specifically, the sensor 120 may obtain various information of an area in which the home appliance 100 is located. For example, when the home appliance 100 is an air conditioner, the sensor 120 may include a temperature sensor, a humidity sensor, or the like, and sense a temperature of a space in which the home appliance 100 is disposed, or detect a humidity of the space in which the home appliance 100 is disposed a humidity sensor. As another example, the sensor 120 may include an IR sensor, a proximity sensor, a camera, or the like, and may detect the user located around the home appliance 100 through the IR sensor, the proximity sensor, or the camera.

Alternatively, the sensor 120 may acquire various information related to the operation of the home appliance 100. For example, when the home appliance 100 is a washing machine, the sensor 120 may include a water level detection sensor, and adjust the amount of water by detecting the amount of water flowing into a motor in the washing machine through the water level detection sensor. As another example, the sensor 120 may be a sensor for detecting an opening/closing of a door of the home appliance 100, and may detect whether the door of the home appliance 100 is opened or closed through the door opening/closing sensor.

Meanwhile, the type of sensor is not limited to the examples described above, and may include a sensor for obtaining various types of information according to the type of the home appliance 100.

The memory 130 stores various data for the overall operation of the home appliance 100 such as a program for processing or controlling the processor 140. Specifically, the memory 130 may store a plurality of application programs operated by the home appliance 100 and data and commands for the operation of the home appliance 100.

The memory 130 may store state information on the home appliance 100. The memory 130 may store operation pattern information on the home appliance 100. Here, the operation pattern information refers to information obtained by analyzing the operation pattern of the home appliance 100. The operation pattern information may be generated based on a plurality of state information, and a detailed description of a method of generating the operation pattern information will be described below in connection with the operation of the processor.

The processor 140 may control the home appliance. The processor 140 may control the components of the home appliance 100 according to the user's control command. For example, when the home appliance 100 is a washing machine, the processor 140 may control an operation of a motor (not shown) to provide rotational force to a drum containing laundry upon receiving a spin-drying command.

In addition, the processor 140 may control the communication device 110 to transmit state information of the home appliance 100 to the server 200. Specifically, when the processor 140 receives a request signal for requesting state information of the home appliance 100 from the server 200, the communication device 110 may control the communication device 110 to transmit the state information of the home appliance 100 to the server 200.

Alternatively, the processor 140 may control the communication device 110 to transmit various state information of the home appliance 100 stored in the memory 130 to the server 200 according to a preset period. Alternatively, the processor 140 may control the communication device 110 to transmit to the server 200 whenever various state information of the home appliance 100 is generated. Meanwhile, the specific operation of the processor 140 transmitting various state information of the home appliance 100 is not limited to the example described above.

In addition, the processor 140 may generate operation pattern information based on the state information of the home appliance 100. Specifically, the processor 140 may generate operation pattern information obtained by analyzing an operation pattern of the home appliance 100 based on a plurality of state information stored in a time series of the home appliance 100. For example, when the home appliance 100 is an air conditioner, the processor 140 may generate operation pattern information including information on the user's preferred set temperature based on a plurality of set temperature information stored in time series.

Meanwhile, the method of generating operation pattern information is not limited to the example described above, and operation pattern information may be generated through a combination of various pieces of information included in the state information.

In addition, the processor 140 may store the generated operation pattern information in the memory 130. In addition, the processor 140 may transmit operation pattern information to the server 200.

In addition, when the processor 140 receives a control command from the terminal device 300 or the server 200, the processor 140 may control each component of the home appliance 100 according to the received control command. In addition, the processor 140 may control the communication device 110 to transmit feedback information on the received control command to the terminal device 300 or the server 200.

Here, the feedback information means information indicating whether a function corresponding to a control command is performed. Specifically, when the home appliance 100 starts or finishes performing a function corresponding to a control command, the feedback information may include information indicating that the function is normally performed. On the other hand, when the home appliance 100 fails to perform a function corresponding to the control command, the function may include information indicating that the function is abnormally terminated or failed.

The input device 150 may include a plurality of function keys through which the user can set or select various functions supported by the home appliance 100. Through this, the user may input various control commands for the home appliance 100. For example, when the home appliance 100 is a washing machine, the user may input a spin-dry command of the washing machine through the input device 150.

In addition, the user's setting value information input through the input device 150 may be stored in the memory 130 as state information of the home appliance 100.

The microphone 160 is a device that converts sound into a sound signal, and may output the user's uttered voice and ambient sound as a voice signal. The microphone 160 may be disposed on a housing surface of the home appliance 100 to collect the user's uttered voice.

In addition, the processor 140 may perform voice recognition using the voice signal acquired through the microphone 160. In addition, the processor 140 may check a control command for the home appliance 100 based on a voice recognition result. In addition, the processor 140 may control each component of the home appliance 100 according to the checked control command.

For example, a voice signal is obtained through the microphone 160 when the user utters "Please wash for 30 minutes". The processor 140 may perform voice recognition using the acquired voice signal, checks that the control command for the home appliance 100 is a control command to perform a "washing function" for "30 minutes", and control command each configuration of the washing machine to perform the washing function for 30 minutes.

In addition, the control command checked through the microphone 160 may be stored in the memory 130 as state information of the home appliance 100.

Meanwhile, according to various embodiments, the microphone 160 may not be provided in the home appliance 100.

Meanwhile, the home appliance 100 may include a light receiver (not shown) in addition to the input device 150 and the microphone 160. The light receiver may receive a light signal corresponding to a user input (e.g., a touch, pressing, a touch gesture, a voice, or a motion) from a remote controller.

Further, the processor 140 may receive the user's set value for the home appliance 100 based on the light signal received through the light receiver (not shown). In addition, the processor 140 may control each function of the home appliance 100 according to an input set value, and the input set value may be stored in the memory 130 as state information of the home appliance 100.

The display 170 is provided on an external surface of the home appliance 100 and is a component for displaying data. The display 170 may be embodied as various forms of displays, such as a liquid crystal display (LCD), an organic light emitting diodes (OLED) display, a plasma display panel (PDP), or the like. The display 170 may include an operation circuit, a backlight unit, or the like which may be implemented in forms such as an a-si TFT, a low temperature poly silicon (LTPS) TFT, an organic TFT (OTFT), or the like. In addition, the display 170 may also be implemented as a flexible display.

The display 170 may display various information provided in the home appliance 100. Specifically, the display 170 may display an operating state of the home appliance 100 or a user interface window for selecting a function and option selected by the user.

For example, when the home appliance 100 is a washing machine, the display 170 may indicate that the washing machine is performing a spin-drying operation, or display an interface window such that the user can select how many minutes to operate the spin-drying function.

Meanwhile, according to various embodiments, the display 170 may not be provided on the home appliance 100.

In addition, although not illustrated in FIG. 2, an additional configuration may be provided in the home appliance 100 according to an exemplary embodiment.

Figure 3:
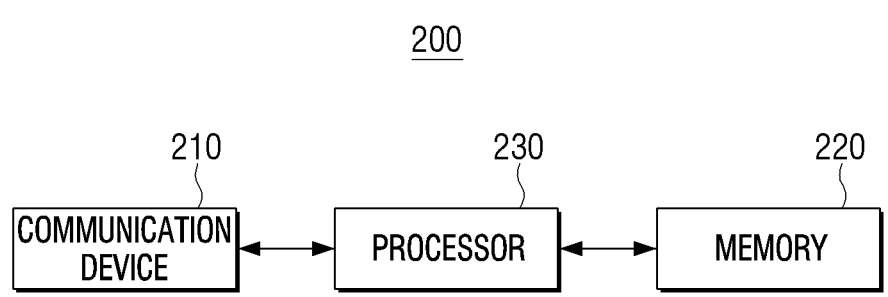
FIG. 3 is a block diagram illustrating a simplified configuration of a server according to an embodiment.

FIG. 3 is a block diagram illustrating a simplified configuration of a server according to an embodiment.

Referring to FIG. 3, a server 200 a communication device 210, a memory 220, and a processor 230.

The communication device 210 is connected to an external device such as the home appliance 100 or a terminal device 300 and performs communication using a plurality of communication methods.

Specifically, the communication device 210 may communicate with an external device using a communication method using a mobile communication network. Here, the mobile communication network may correspond to not only 3G, LTE, and 5G, but also low power wireless network (LPWN) and low power wide area network (LPWAN) such as NB-IoT, LoRa, SigFox, and LTE-CAT1. In addition, the communication device 110 may perform communication using a communication method using a wireless LAN such as Wi-Fi 802.11a/b/g/n as well as a wired local area network (LAN). In addition to this, the communication device 210 may communicate with an external device using a communication method such as NFC and Bluetooth.

In addition, the communication device 210 may communicate with the home appliance 100 to transmit and receive various types of information. Specifically, the communication device 210 may perform communication with the home appliance 100 to receive state information of the home appliance 100. Here, the state information is information necessary to check the overall state of the home appliance 100, and may include device information of the home appliance 100, operation history information, set value information, sensing information of the sensor in the home appliance 100, and system parameters, or the like, but is not limited to the example described above.

The communication device 210 may perform communication with the home appliance 100 to receive operation pattern information of the home appliance 100. Specifically, when the home appliance 100 generates operation pattern information on its own, the communication device 210 may receive operation pattern information from the home appliance 100.

In addition, the communication device 210 may receive state information or operation pattern information of the home appliance 100 according to a preset period. Alternatively, the communication device 210 may receive state information of the home appliance 100 in real time. Meanwhile, the operation of receiving the state information or operation pattern information of the home appliance 100 by the communication device 210 is not limited to the example described above.

The memory 220 stores various data for overall operation of the server 200 such as a program for processing or controlling the processor 230. Specifically, the memory 220 may store a plurality of application programs operating in the server 200 and data and instructions for the operation of the server 200.

In addition, the memory 220 may store state information or operation pattern information of the home appliance 100. Specifically, the memory 220 may store state information or operation pattern information of the home appliance 100 received from the home appliance 100. Alternatively, the memory 220 may store operation pattern information generated by the processor 230 using state information of the home appliance 100.

The memory 220 may store not only one home appliance but also device information, state information, and operation pattern information for each of a plurality of home appliances.

In addition, the memory 220 may store state item information corresponding to each of the plurality of keywords. A detailed description of this will be described below in connection with the operation of the processor 230.

The processor 230 controls the server 200. Specifically, the processor 230 may control each component of the server 200 according to the user's control command.

In addition, the processor 230 may generate operation pattern information based on the state information of the home appliance 100. Specifically, the processor 230 may generate operation pattern information obtained by analyzing an operation pattern of the home appliance 100 based on the plurality of state information received in time series from the home appliance 100.

Meanwhile, the method of generating operation pattern information is not limited to the example described above, and operation pattern information may be generated through a combination of various pieces of information included in the state information.

The processor 230 may store the generated operation pattern information in the memory 220. In addition, the processor 230 may update the operation pattern information pre-stored in the memory 220 based on the additionally received state information.

In addition, the processor 230 may receive a query for the home appliance 100 from the terminal device 300. Specifically, the processor 230 may receive a query for the home appliance 100 including the text input by the user from the terminal device 300 through a display displaying an input device of the terminal device 300 or a user interface window.

Here, the text input by the user may be a text corresponding to a question or problem regarding the home appliance 100 by the user. For example, the query may include text corresponding to a question such as "What is the set temperature now?". In addition, the query may include device information on the home appliance 100, and may include additional information in the exception described above.

In addition, the processor 230 may generate response information corresponding to the received query. Specifically, the processor 230 may analyze the text included in the received query, and use the result of analyzing the text and the state information and operation pattern information of the home appliance 100 to generate response information including the information desired by the user.

Here, the response information may include specific information related to the current state of the home appliance 100 that the user wants to ask through the query. For example, the response information may include information on a value sensed through a specific sensor of the home appliance 100 or setting information. In addition, the response information may include information on an error occurring in the home appliance 100 or information on how to resolve the error. In addition, the response information may include usage information of the home appliance 100 or the like. The response information may include various information in addition to this.

Hereinafter, a detailed operation of the processor 230 generating response information corresponding to a query will be described.

First, the processor 230 may extract a keyword included in the received query. Specifically, the processor 230 may extract a keyword from the text input by the user through the terminal device 300 included in the received query.

Here, the key word refers to a key word for grasping an intention that the user wants to inquire through text. Keywords may be set differently according to the type of home appliance 100.

For this operation, the processor 230 may extract a keyword by comparing the keyword list pre-stored in the memory 220 with text included in the query. For example, if the query includes text such as "What is the set temperature now?", the processor 230 may extract the "set temperature" as a keyword.

In addition, the processor 230 may check at least one state item corresponding to the extracted keyword. Specifically, the processor 230 may check at least one state item corresponding to the extracted keyword among state items corresponding to each of the plurality of keywords pre-stored in the memory 220. The state item refers to an item of state information and operation pattern information.

For example, when the extracted keyword is "set temperature", the processor 230 may check that the state item corresponding to the "set temperature" among the plurality of state items is set temperature information of the home appliance 100. As another example, the extracted keyword is "reserved time", the processor 230 may check that the state item corresponding to the "reserved time" among the plurality of state items is reserved time information of the home appliance 100.

In addition, when the extracted keywords are plural, the processor 230 may check at least one state item corresponding to the extracted plural keyword combinations. Specifically, the processor 230 may check at least one state item corresponding to the extracted keyword combination among state items corresponding to each of the plurality of keyword combinations pre-stored in the memory 220.

For example, when the extracted plurality of keywords are "filter" and "replacement", the processor 230 may check that the state item corresponding to a combination of the "filter" and "replacement" is information on a replacement time of the filter of the home appliance 100. Meanwhile, the method of checking the corresponding state item using the extracted keyword is not limited to the example described above.

In addition, the processor 230 may generate response information by using information corresponding to the checked state item among state information and operation pattern information of the home appliance 100.

Specifically, the processor 230 may identify the current state of the home appliance 100 by using information corresponding to the identified state item in the state information and operation pattern information of the home appliance 100 stored in the memory 220 to generate response information including information related to the current state of the home appliance 100, error information occurring in the home appliance 100, information on how to resolve errors for errors occurring in the home appliance 100, or information on how to use the home appliance 100.

For example, when the home appliance 100 is an air conditioner, and a query including a text "What is the set temperature now" is received from the terminal device 300, the processor 230 may extract "set temperature" as a keyword and check set temperature information as a state item corresponding to the "set temperature". Also, the processor 230 may generate response information including text information related to a current state of the home appliance 100, such as "The current set temperature is 22 degrees".

Meanwhile, when there are a plurality of checked state items among the state information and operation pattern information, the processor 230 may check the state information and operation pattern information corresponding to the plurality of checked state items, and generate response information based on at least one of the corresponding plurality of state information and operation pattern information.

For example, the home appliance 100 is a washing machine, and a query including the text "The door does not open" may be received from the terminal device 300. In this case, the processor 230 may extract a keyword "door" and "not open", and check state item corresponding to a combination of the "door" and "not open".

In the case of the washing machine, there are cases where an internal temperature is very high after performing a drying function, and a door is locked for a certain period of time to prevent burns, or the door is locked because washing water is not drained after a washing function is performed. Accordingly, a state item corresponding to a combination of "door" and "not open" may be set as "drying function operation end time", "internal temperature", or "wash water level".

In addition, the processor 230 may check information on the drying function operation end time, internal temperature information, and washing water level information of the washing machine in order to identify which case the washing machine currently belongs among the cases described above. In addition, the processor 230 may identify which case the washing machine currently belongs based on the checked information. If it is identified that the drainage of the washing water has not been completed, the processor 230 may generate response information including text information such as "the drainage is not completed".

In addition, the processor 230 may control the communication device 210 to transmit the generated response signal to the terminal device 300.

Meanwhile, when the state information and operation pattern information for each of the plurality of home appliances are stored in the memory 220, the processor 230 may compare the device information of the home appliance 100 included in the query with the device information of the plurality of home appliances pre-stored in the memory 220 to check the corresponding home appliance among the plurality of home appliances, and generate response a response signal based on the checked state information and operation pattern information of the home appliance.

In addition, the processor 230 may perform an operation of extracting the keywords described above using the artificial intelligence model or an operation of checking at least one state item corresponding to the extracted keyword.

Specifically, the processor 230 may extract keywords by analyzing text included in a received query using a natural language processing (NLP) model. Alternatively, the processor 230 may analyze text included in the received query using a natural language processing (NLP) model to extract a keyword, and even perform an operation of checking at least one state item corresponding to the extracted keyword. Meanwhile, a detailed description thereof will be described below with reference to FIG. 8.

Meanwhile, the processor 230 may control the communication device 210 to transmit specific information on the home appliance 100 to the terminal device 300 even if the query is not received from the terminal device 300.

Specifically, when the processor 230 receives the state information of the home appliance 100 from the home appliance 100, the processor 230 may generate the operation pattern of the home appliance 100 based on the received state information. Alternatively, the processor 230 may receive state information of the home appliance 100 and operation pattern information generated by the home appliance 100 from the home appliance 100.

In addition, the processor 230 may check whether the home appliance 100 has an error based on the state information and the operation pattern information. Specifically, the processor 230 may check whether a specific error has occurred in the home appliance 100 or whether a specific error is expected to occur based on the state information and operation pattern information of the home appliance 100.

If a specific error occurs or is expected to occur in the home appliance 100, the processor 230 may control the communication device 210 to transmit error information to the terminal device 300.

Meanwhile, although only a simple configuration that constitutes the electronic apparatus has been illustrated and described, various configurations may be additionally provided during implementation. The relevant additional units will be explained below by referring to FIG. 4.

Figure 4:
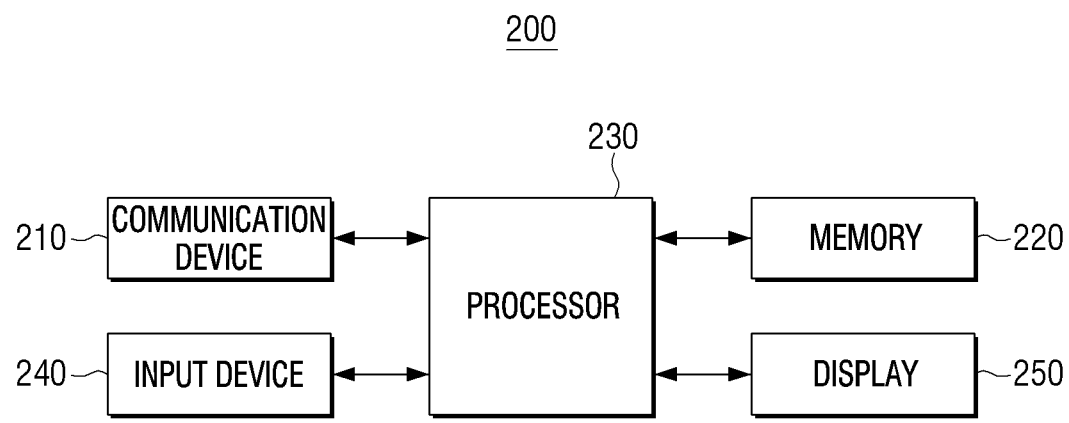
FIG. 4 is a block diagram illustrating a specific configuration of a server according to an embodiment.

FIG. 4 is a block diagram showing a detailed configuration of a server according to an embodiment of the disclosure.

Referring to FIG. 4, the server 200 may include a communication device 210, a memory 220, a processor 230, an input device 240, and a display 250.

The communication device 210 and the memory 220 perform the same functions as those of FIG. 3, and thus duplicate explanation thereof will be omitted. In addition, since the processor 230 has been described with reference to FIG. 3, the explanation described in FIG. 3 will not be repeated, and only the explanation related to the configuration added to FIG. 4 will be described below.

The input device 240 may include a plurality of function keys through which the user can set or select various functions supported by the server 200. Through this, the user may input various control commands for the home appliance 100.

The display 250 may display various types of information provided from the server 200. An administrator of the server 200 may manage state information and operation pattern information of the home appliance 100 through the input device 240 and the display.

Conventionally, users may inquire about appliances to a service center counselor or obtain instructions and a method of solving errors through an application that collects frequently asked questions about home appliances and answers them.

However, in the case of using a service center counselor among the conventional methods, there is a problem in that a correct state of the home appliance cannot be determined because the counselor must estimate the cause after hearing the symptoms described by the user. In addition, when using an application that collects and provides answers to frequently asked questions about home appliances, since it is possible to respond only to general situations, there is a problem that feedback appropriate to the current state of the home appliance may not be made.

However, in the disclosure, a text corresponding to an inquiry entered by the user through a terminal device is analyzed, and response information is generated based on the state information and operation pattern information of the home appliance corresponding to the analysis result. Since a detailed description of the user is not required, user convenience is increased, and feedback suitable for the current state of the home appliance may be provided.

Figure 5:
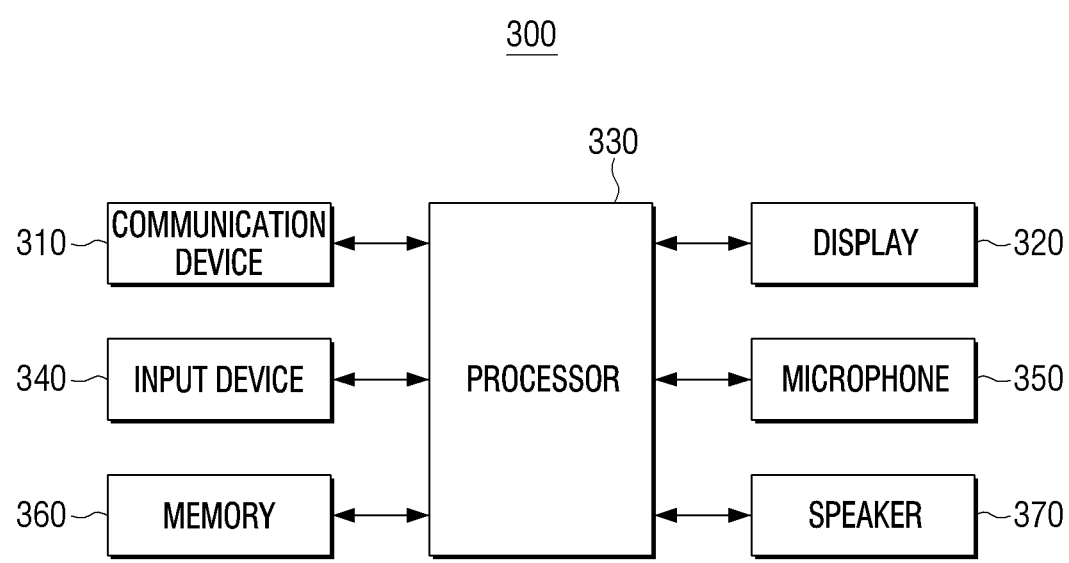
FIG. 5 is a block diagram illustrating a configuration of a terminal device according to an embodiment.

FIG. 5 is a block diagram illustrating the detailed configuration of the terminal device according to an embodiment of the disclosure.

Referring to FIG. 5, the terminal device 300 is composed of a communication device 310, a display 320, a processor 330, an input device 340, a microphone 350, a memory 360, and a speaker 370.

The communication device 310 is connected to an external device (not shown) and communicates with an external device using a plurality of communication methods.

Specifically, the communication device 310 may communicate with the external device using a communication method using a mobile communication network. The mobile communication network may correspond to not only 3G, LTE, and 5G, but also low power wireless network (LPWN) and low power wide area network (LPWAN) such as NB-IoT, LoRa, SigFox, and LTE-CAT1. In addition, the communication device 110 may perform communication using a communication method using a wireless LAN such as WiFi 802.11a/b/g/n as well as a wired local area network (LAN). In addition to this, the communication device 310 may communicate with the external device using a communication method such as NFC and Bluetooth.

In addition, the communication device 310 may communicate with the server 200 to transmit and receive various types of information. Specifically, the communication device 310 may communicate with the server 200 to transmit a query for the home appliance to the server 200. In addition, the query may include text input from the user through the display 320 displaying the user interface window or text input from the user through the input device 340. The text input by the user may be a text corresponding to a question or problem regarding the home appliance 100 by the user.

In addition, the communication device 310 may receive response information corresponding to the query transmitted from the server 200.

The display 320 is provided on the outer surface of the terminal device 300 and is a component for displaying data. The display 320 may be embodied as various forms of displays, such as a liquid crystal display (LCD), an organic light emitting diodes (OLED) display, a plasma display panel (PDP), or the like. The display 320 may include an operation circuit, a backlight unit, and the like which may be implemented in forms such as an a-si TFT, a low temperature poly silicon (LTPS) TFT, an organic TFT (OTFT), and the like. In addition, the display 320 may also be implemented as a flexible display.

The display 320 may display various types of information provided from the terminal device 300. Specifically, the display 320 may display an operating state of the terminal device 300 or a user interface window for selecting a function and option selected by the user.

The display 320 may receive a text-based query for the home appliance 100 from the user through a user interface window. Specifically, the display 320 may display a chat application installed in the terminal device 300 on the user interface window, and receive the text-based query for the home appliance 100 from the user through the chat application.

The display 320 may receive the text-based query for the home appliance 100 from the user through the input device 340. Specifically, the display 320 may receive the text-based query for the home appliance 100 from the user through the input device 340 including a plurality of buttons.

In addition, the display 320 may display the received text. Specifically, the display 320 may display the received text through the chat application.

Meanwhile, when a plurality of home appliances are registered in the terminal device 300, the display 320 may receive a selection of one home appliance from the plurality of home appliances from the user, and the query for the home appliance selected by the user.

In addition, the display 320 may display response information received from the server 200 through the user interface window.

The response information is information generated by the server 200, and may include not only information related to the current state of the home appliance 100 but error information occurring in the home appliance 100, information on how to resolve errors for the error occurring in the home appliance 100, information on how to use the home appliance 100, or the like. In addition, the information described above included in the response information may include text, an image, an image, or the like.

The response information is information generated by extracting a keyword from the text included in the query received from the terminal device 300, checking at least one state item corresponding to the extracted keyword, and using information corresponding to at least one state item checked among the state information and operation pattern information of the home appliance 100.

Meanwhile, a specific method of generating response information has been described above with respect to the operation of the server 200, and redundant descriptions will be omitted.

Specifically, the display 320 may display response information received from the server 200 through a chat application displayed on the user interface window in text, image, or video format.

For example, when the user enters the text "What is the set temperature now" through the chat application, a text-based query may be transmitted to the server 200, and when the response information corresponding to the query transmitted from the server 200 is received, the display 320 may display text such as "The current set temperature is 22 degrees" included in the response information in a conversational format through a chat program.

As another example, when the user enters the text "Tell me how to install" through the chat application, a text-based query is transmitted to the server 200, and when response information corresponding to the query transmitted from the server 200 is received, the display 320 may display a video on the installation method included in the response information through the program.

Meanwhile, the method of displaying the response information received by the display 320 is not limited to the example described above.

The processor 330 may control the terminal device. Specifically, the processor 330 may control the components of the terminal device 100 according to the user's control command.

In addition, the processor 330 may control the communication device 310 to transmit the text-based query input through the display 320 to the server 200. In addition, the processor 330 may control the communication device 310 to transmit a query including text corresponding to the user's uttered voice sensed through the microphone 350 to the server 200. An operation of transmitting a query including text corresponding to the user's uttered voice sensed through the microphone 350 will be described later in connection with the operation of the microphone 350.

In addition, the processor 330 may receive response information corresponding to the query transmitted from the server 200.

In addition, the processor 330 may control the display 320 to display response information received from the server 200 through the user interface window. Specifically, the processor 330 may control the display 320 to display response information received from the server 200 in a text, image, or video format through the chat application displayed on the user interface window.

The input device 340 may include a plurality of function keys with which the user may set or select various functions supported by the server 200, so that the user may input various control commands for the server 200. At the time of implementation, the input device 340 may also be implemented as a touch screen capable of performing a function of the display 320.

The input device 340 may receive a query for the home appliance 100 from the user. In addition, text input through the input device 340 may be displayed on the display 320.

The microphone 350 is a device that converts sound into a sound signal, and may output the user's uttered voice and ambient sound as a voice signal. Meanwhile, in the disclosure, although the terminal device 300 has been illustrated and described as including one microphone, it may include a plurality of microphones.

In addition, the microphone 350 may transmit a voice signal corresponding to the sensed user's uttered voice to the processor 330. Further, the processor 330 may generate a text corresponding to the voice signal by performing voice recognition based on the received voice signal. In addition, the processor 330 may control the display 320 to display the generated text.

Specifically, when the user's uttered voice is sensed through the microphone 350 while the chat program is displayed on the display 320, and a voice signal corresponding to the user's uttered voice is transmitted to the processor 330, the processor 330 may perform speech recognition based on the transmitted voice signal and generate a text corresponding to the user uttered speech. In addition, the processor 330 may control the display 320 to display the generated text through the chat application.

For example, when the user speaks a voice such as "What is the set temperature now" while the chat program is being displayed, the processor 330 may receive a voice signal from the microphone and perform voice recognition to generate text such as "What is the set temperature now".

In addition, the processor 330 may transmit a query including the generated text to the server 200.

Meanwhile, according to various embodiments, the microphone 350 may not be provided in the terminal device 300.

Meanwhile, the voice input or uttered by the user through the display 320, the input device 340, or the microphone 350 may include a control command rather than a question about the home appliance 100. For example, a control command such as "increase the temperature by two degrees" may be included.

In this case, the processor 330 may control the communication device 310 to transmit a query including a control command to the server 200, and when receiving response information including feedback information corresponding to the control command from the server 200, the display 320 may be controlled to display the received feedback information.

For example, when the home appliance 100 receives feedback information indicating that the set temperature has been lowered by two degrees according to the control command to lower the set temperature by two degrees, the processor 330 may control the display 320 to display the feedback information "the set temperature has been lowered by two degrees" through the user interface window.

The memory 360 stores various data for the overall operation of the terminal device 300 such as a program for processing or controlling the processor 330. Specifically, the memory 360 may store a plurality of application programs operated by the terminal device 300 and data and commands for operation of the server 200.

Specifically, the memory 360 may store a chat application operated by the terminal device 300. In addition, the processor 330 may execute a chat application stored in the memory 360 according to the user's control.

In addition, the memory 360 may store information on a query transmitted to the server 200 through the chat application and response information corresponding to the query received from the server 200.

The speaker 370 is provided in the terminal device 300 and may output sound to the outside of the terminal device 300. Specifically, the speaker 370 may convert and output an electrical signal into sound under the control of the processor 330.

In addition, when the response information includes audio information or image information, the speaker 370 may convert an audio signal included in the audio information or image information into sound and output it. Specifically, the speaker 370 may convert the audio signal of audio information or image information included in the response information into sound and output it under the control of the processor 330.

For example, when the display 320 displays video information (i.e., response information) explaining how to use the home appliance 100 through a chat program, and receives a play command for the video from the user, the processor 330 may control the speaker 370 to convert the audio signal included in the image information into sound and output it.

In addition, although not illustrated in FIG. 5, an additional configuration may be provided in the terminal device 300 according to an exemplary embodiment.

Conventionally, users may inquire about appliances to a service center counselor or obtain instructions and a method of solving errors through an application that collects frequently asked questions about home appliances and answers them.

However, in the case of using a service center counselor among the conventional methods, there is a problem in that a correct state of the home appliance cannot be determined because the counselor must estimate the cause after hearing the symptoms described by the user. In addition, when using an application that collects and provides answers to frequently asked questions about home appliances, since it is possible to respond only to general situations, there is a problem that feedback appropriate to the current state of the home appliance may not be made.

However, in the disclosure, when a user selects a home appliance for inquiries through a chat program installed on the terminal device and inputs an inquiry about the selected home appliance, response information generated may be identified based on the state information and operation pattern information of the home appliance. Since a detailed description of the user is not required, user convenience is increased, and feedback suitable for the current state of the home appliance may be provided.

Figure 6:
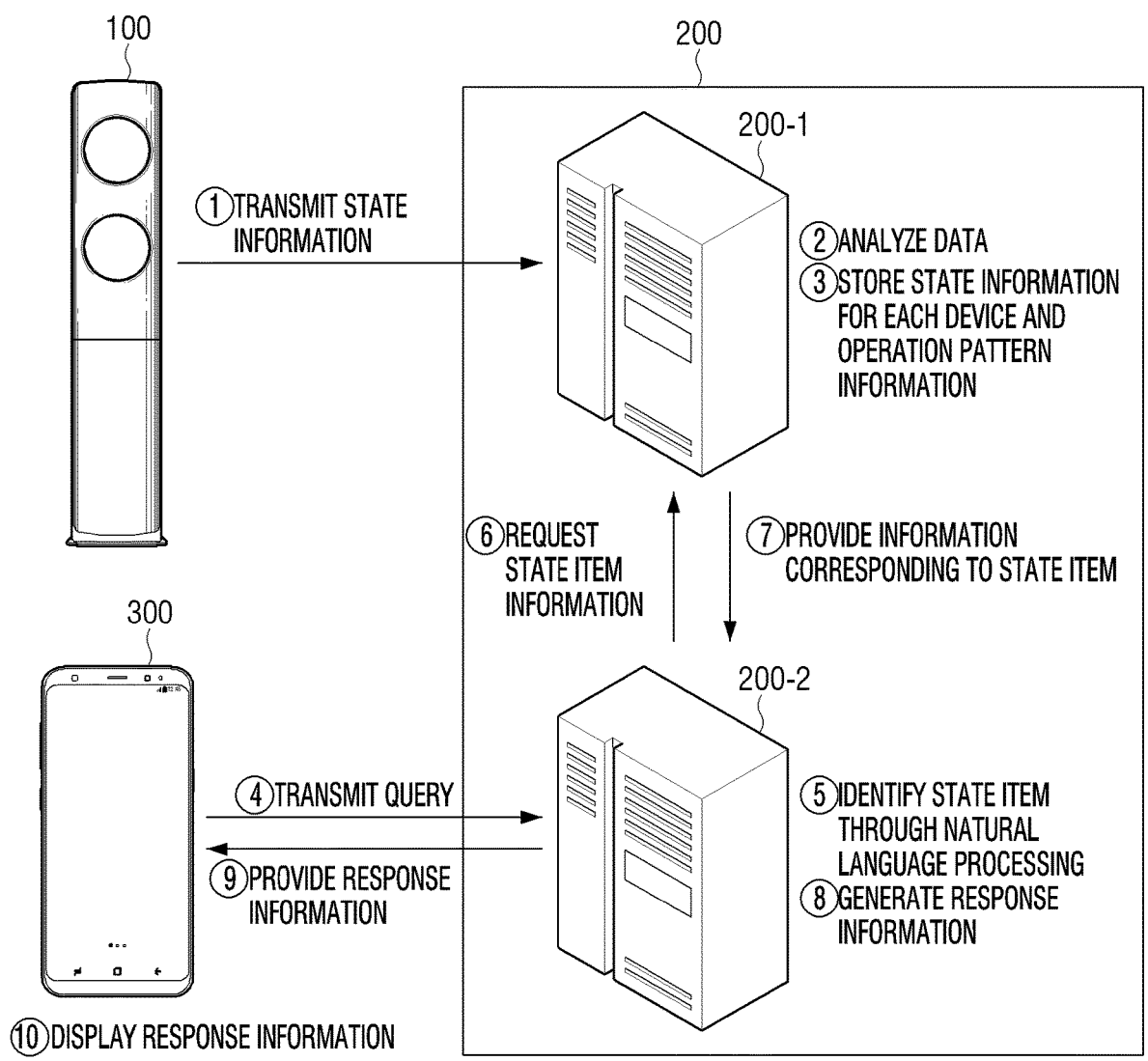
FIG. 6 is a view illustrating a method of generating an answer to a user's inquiry according to an embodiment.

FIG. 6 is a view illustrating a method of generating an answer to the user's inquiry according to an embodiment of the disclosure.

Referring to FIG. 6, the server 200 includes a management server 200-1 and a Chatbot server 200-2. The management server 200-1 manages state information and operation pattern information of the home appliance 100, and the Chatbot server 200-2 analyzes a query received from the terminal device 300 and request information necessary for the management server 200-1, and generate response information. A detailed operation for this will be described below.

The home appliance 100 may transmit state information to the management server 200-1 (①). Specifically, the home appliance 100 may transmit state information to the management server 200-1 according to a preset period. Alternatively, the home appliance 100 may transmit various state information to the management server 200-1 whenever various state information is generated. Meanwhile, a specific operation for the home appliance 100 to transmit state information is not limited to the example described above.

If the management server 200-1 communicates with a plurality of home appliances, the management server 200-1 may receive state information from each of the plurality of home appliances.

The management server 200-1 may generate operation pattern information by analyzing the operation pattern of the home appliance 100 based on the received state information (②). Specifically, the management server 200-1 may generate operation pattern information obtained by analyzing an operation pattern of the home appliance 100 based on a plurality of state information stored in a time series. Alternatively, the management server 200-1 may generate operation pattern information through a combination of various information in the state information.

The management server 200-1 may store state information and operation pattern information of the home appliance 100 (③). If state information is received from the plurality of home appliances and operation pattern information of each of the plurality of home appliances is generated based on the received state information, state information and operation pattern information may be stored for each of the plurality of home appliances.

The terminal device 300 may receive a text-based query for the home appliance 100 from the user through a user interface window of the display 320. In addition, the received query may be transmitted to the Chatbot server 200-2 (④). Meanwhile, the terminal device 300 may perform voice recognition on the user's uttered voice detected through the microphone 350 and may transmit a query including text corresponding to the user's uttered voice to the Chatbot server 200-2. In addition, the query may further include device information on the home appliance 100.

The Chatbot server 200-2 may extract a keyword included in the received query and check at least one state item corresponding to the extracted keyword. Specifically, the Chatbot server 200-2 may extract a keyword by comparing a pre-stored keyword list with a text included in the query, and check at least one state item corresponding to the extracted keyword among the state item information corresponding to each of the plurality of pre-stored keywords. Detailed operations for this have been described above, and redundant descriptions will be omitted.

Alternatively, the Chatbot server 200-2 may extract a keyword included in the received query using a natural language processing (NLP) artificial intelligence model, and check at least one state item corresponding to the extracted keyword (⑤). A detailed description of this will be described below with reference to FIG. 8.

In addition, the Chatbot server 200-2 may request information on the home appliance 100 corresponding to the checked at least one state item from the management server 200-1 (⑥). In this case, the Chatbot server 200-2 may transmit and request device information for the home appliance 100 included in the query or the extracted keyword together.

In addition, the management server 200-1 checks information corresponding to at least one state item requested by the Chatbot server 200-2 among the pre-stored state information and operation pattern information of the home appliance 100, and provide the checked information. to the Chatbot server 200-2 (⑦).

Specifically, when the management server 200-1 stores state information and operation pattern information for each of the plurality of home appliances, the home appliance 100 may check the home appliance 100 corresponding to the information requested by the Chatbot server 200-2 using the device information of the home appliance 100, check at least one state item among the state information and operation pattern information of the home appliance, and provide the checked information to the Chatbot server 200-2 again.

The management server 200-1, in addition to the checked information, may identify the current state of the home appliance 100 based on the received keyword information and information corresponding to at least one state item of the home appliance 100, and transmit a specific information related to the current state of the home appliance 100 to the Chatbot server 200-2.

The specific information related to the current state of the home appliance 100 may correspond to error information occurring in the home appliance 100, information on how to resolve errors for an error occurring in the home appliance 100, information on how to use the home appliance 100, or the like.

The Chatbot server 200-2 may generate response information using information received from the management server 200-1 (⑧). Specifically, the Chatbot server 200-2 may use the state information and operation pattern information, error information, information on a method of solving errors or information of using the home appliance 100 received from the management server 200-1 to generate response information providing interactive guidance to the user.

In addition, the Chatbot server 200-2 may transmit the generated response information to the terminal device 300 (⑨).

In addition, the terminal device 300 may display response information received from the Chatbot server 200-2 through the user interface window of the display 320 (⑩). Specifically, the terminal device 300 may display response information received from the chat server 200 through a chat application displayed on the user interface window in a text, image, or video format.

Meanwhile, it has been described in the illustration and description of FIG. 6 that the server 200 includes the management server 200-1 and the Chabot server 200-2, but at the time of implementation, the management server 200-1 and the Chabot server 200-2 may be implemented as a separate configuration.

In addition, in the illustration and description of FIG. 6, it has been illustrated and described in FIG. 6 that the home appliance 100 transmits only the state information to the management server 200-1, but at the time of implementation, it may be implemented that the home appliance 100 generates operation pattern information based on the state information, and transmit the state information and operation pattern information to the server 200.

Figure 7:
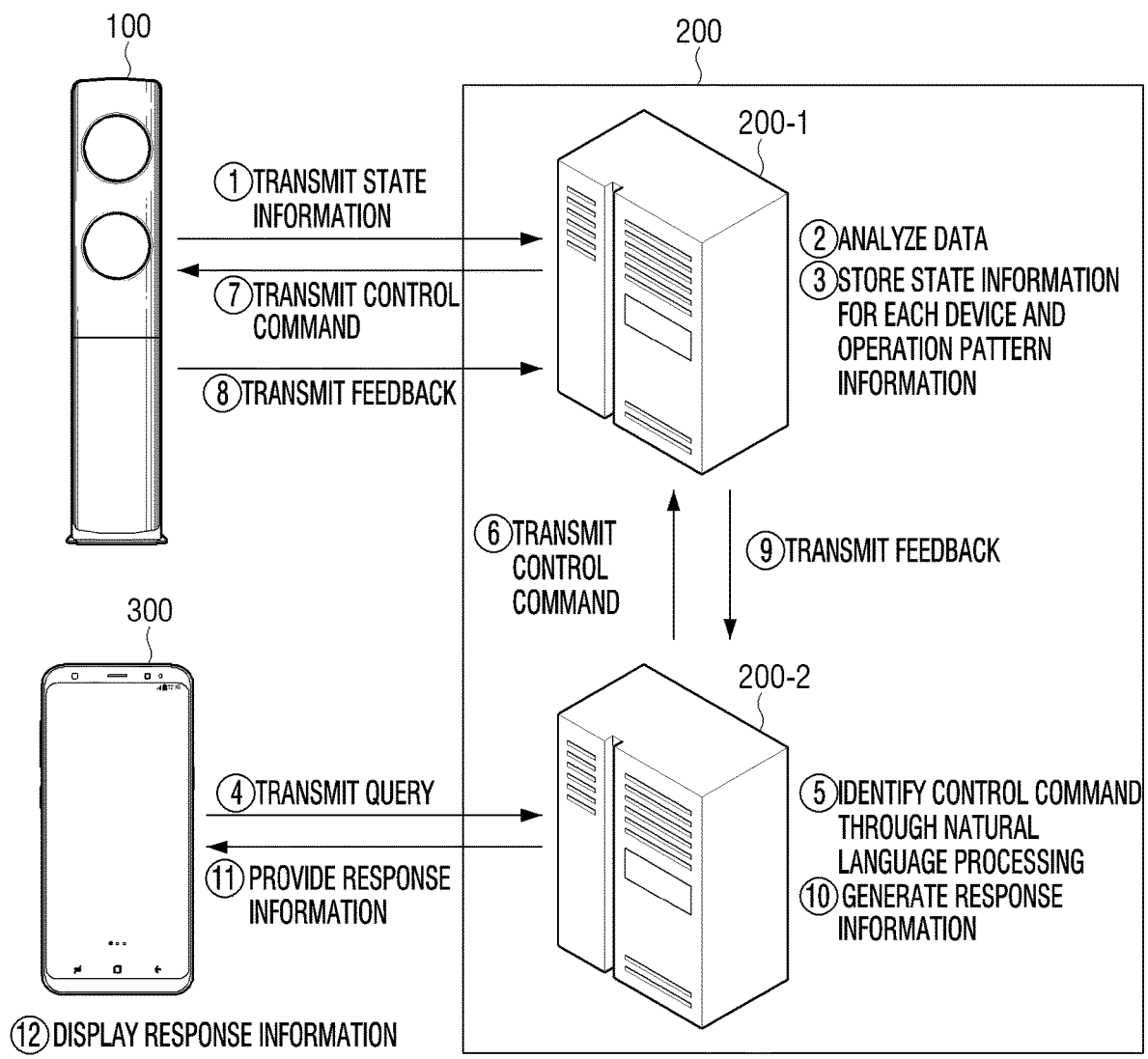
FIG. 7 is a view illustrating a method of generating a feedback response to a control command of a user according to an embodiment.

FIG. 7 is a view illustrating a method of generating a feedback response to a control command of a user according to an embodiment of the disclosure.

The user may input a question about the home appliance 100 through the terminal device 300 and receive response information to the question from the server 200. However, in addition to this, the user may indirectly control the home appliance 100 through the server 200 by inputting a control command for the home appliance 100 through the terminal device 300. A detailed description of this will be described below.

The home appliance 100 may transmit state information to the management server 200-1 (①). If the management server 200-1 communicates with a plurality of home appliances, the management server 200-1 may receive state information from each of the plurality of home appliances.

The management server 200-1 may generate operation pattern information by analyzing the operation pattern of the home appliance 100 based on the received state information (②).

In addition, the management server 200-1 may store state information and operation pattern information of the home appliance 100 (③). If state information is received from the plurality of home appliances and operation pattern information of each of the plurality of home appliances is generated based on the received state information, state information and operation pattern information may be stored for each of the plurality of home appliances.

In addition, the terminal device 300 may receive a text-based query for the home appliance 100 from the user through the user interface window of the display 320. In addition, the received query may be transmitted to the Chabot server 200-2 (④). Meanwhile, the terminal device 300 may perform voice recognition on the user's uttered voice sensed through the microphone 350 and may transmit a query including text corresponding to the user's uttered voice to the Chabot server 200-2. In addition, the query may further include device information on the home appliance 100.

In this case, the text input by the user or the text corresponding to the user's uttered voice may include a control command.

The Chabot server 200-2 may extract a keyword by comparing a pre-stored keyword list with text included in the query, and check whether a word corresponding to the control command is included in the extracted keyword.

Alternatively, the Chabot server 200-2 may extract a keyword included in the received query using a natural language processing (NLP) artificial intelligence model, and check whether a word corresponding to the control command is included in the extracted keyword (⑤).

When it is checked that the extracted keyword includes a word corresponding to the control command, the Chabot server 200-2 may transmit the control command to the management server 200-1 (⑥). In this case, the Chabot server 200-2 may transmit device information about the home appliance 100 together.

The management server 200-1 may transmit the received control command to the home appliance 100. Specifically, the management server 200-1 may transmit the received control command to the home appliance 100 based on the received device information on the home appliance 100 (⑦).

In addition, the management server 200-1 may receive feedback information from the home appliance 100 (⑧). Here, the feedback information means information indicating whether a function corresponding to a control command is performed. Specifically, when the home appliance 100 starts or finishes performing a function corresponding to a control command, the feedback information may include information indicating that the function is normally performed. Meanwhile, when the home appliance 100 fails to perform the function corresponding to the control command, it may include information indicating that the function is abnormally terminated or failed.

Alternatively, the management server 200-1 may additionally receive state information from the home appliance 100 and identify whether the home appliance 100 has performed a function corresponding to the control command transmitted to the home appliance 100 based on the additionally received state information to directly generate feedback information.

In addition, the management server 200-1 may transmit the feedback information to the Chabot server 200-2 (⑨). In addition, the Chabot server 200-2 may generate response information using the feedback information received from the management server 200-1 (⑩). Specifically, the Chabot server 200-2 may generate response information providing a guide on whether to perform the control command in a conversational format to the user by using the feedback information received from the management server 200-1.

The Chabot server 200-2 may transmit the generated response information to the terminal device 300 (⑪).

The terminal device 300 may display response information received from the Chabot server 200-2 through the user interface window of the display 320 (⑫). Specifically, the terminal device 300 may display feedback information included in response information received from the chat server 200 through a chat application displayed on the user interface window in a text, image, or video format.

Meanwhile, in the illustration and description of FIG. 7, the server 200 is composed of a management server 200-1 and a Chabot server 200-2, but at the time of implementation, the management server 200-1 and the Chabot server 200-2 may be implemented as a separate configuration.

Figure 8:
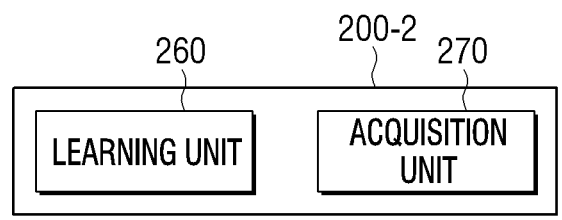
FIG. 8 is a block diagram illustrating a configuration of a server for learning and using an artificial intelligence model according to an embodiment.

FIG. 8 is a block diagram illustrating a configuration of a server for learning and using an artificial intelligence model according to an embodiment of the disclosure.

Referring to FIG. 8, the Chabot server 200-2 may include at least one of a learning unit 260 and an acquisition unit 270.

The Chabot server 200-2 may use the natural language processing (NLP) artificial intelligence model to extract a keyword from the text included in the query received from the terminal device 300 or to perform an operation of checking at least one state item corresponding to the extracted keyword.

Hereinafter, a specific operation in which the Chabot server 200-2 generates an artificial intelligence model through the learning unit 260 and the acquisition unit 270 and performs the operation described above using the generated artificial intelligence model will be described.

An operation of extracting keywords using an artificial intelligence model will be described.

The learning unit 260 may generate or train a model using the natural language processing (NLP) artificial intelligence model that extracts keywords from text. The learning unit 260 may generate an artificial intelligence model that extracts keywords by using the collected learning data. The learning unit 260 may correspond to a training set of the artificial intelligence model.

For example, the learning unit 260 may generate, learn, or update a model for extracting a keyword of the text by using text corresponding to a question about the home appliance as input data.

Particularly, when the input data of the learning unit 260 is composed of a plurality of texts corresponding to a question having a similar meaning, even though the text is different, a model for extracting the same keyword may be generated, learned, or updated.

For example, the learning unit 260 may generate, train or update a model that equally extracts keywords such as "cooling" and "insufficient" with respect to each input data indicating dissatisfaction with cooling performance, such as "cold air flow is weak," "cooling is weak," "indoors are not cool," "indoor temperature is not going down" or the like.

The acquisition unit 270 may extract keywords by using predetermined data as input data of a trained model to extract keywords from text. For example, a keyword of the text included in the query may be extracted by using the text included in the query received from the terminal device 300 as input data of the trained model.

Hereinafter, an operation of checking at least one state item corresponding to the extracted keyword will be described.

The learning unit 260 may generate or train a model for checking at least one state item corresponding to a keyword. The learning unit 260 may generate an artificial intelligence model that checks at least one state item corresponding to a keyword by using the collected learning data. The learning unit 260 may correspond to a training set of an artificial intelligence model.

The acquisition unit 270 may extract a keyword by using the predetermined data as input data of the trained model to check at least one state item corresponding to the keyword. For example, at least one state item corresponding to the keyword may be checked by using the keyword extracted from the text included in the query received from the terminal device 300 as input data of the trained model.

Meanwhile, it has been described that the learning unit 260 and the acquisition unit 270 generate and use an artificial intelligence model that performs an operation of extracting a keyword, and an artificial intelligence model that performs an operation of checking a state item corresponding to the keyword, respectively, the learning unit 260 and the acquisition unit 270 may generate and use an artificial intelligence model that extracts a keyword and checks a state item corresponding to the keyword at once.

Meanwhile, in the illustration and description of FIG. 8, it has been described that the Chabot server 200-2 includes at least one of a learning unit and an acquisition unit, but at the time of implementation, it may be implemented that the processor 230 of the server 200 includes at least one of the learning unit and the acquisition unit.

Figure 9:
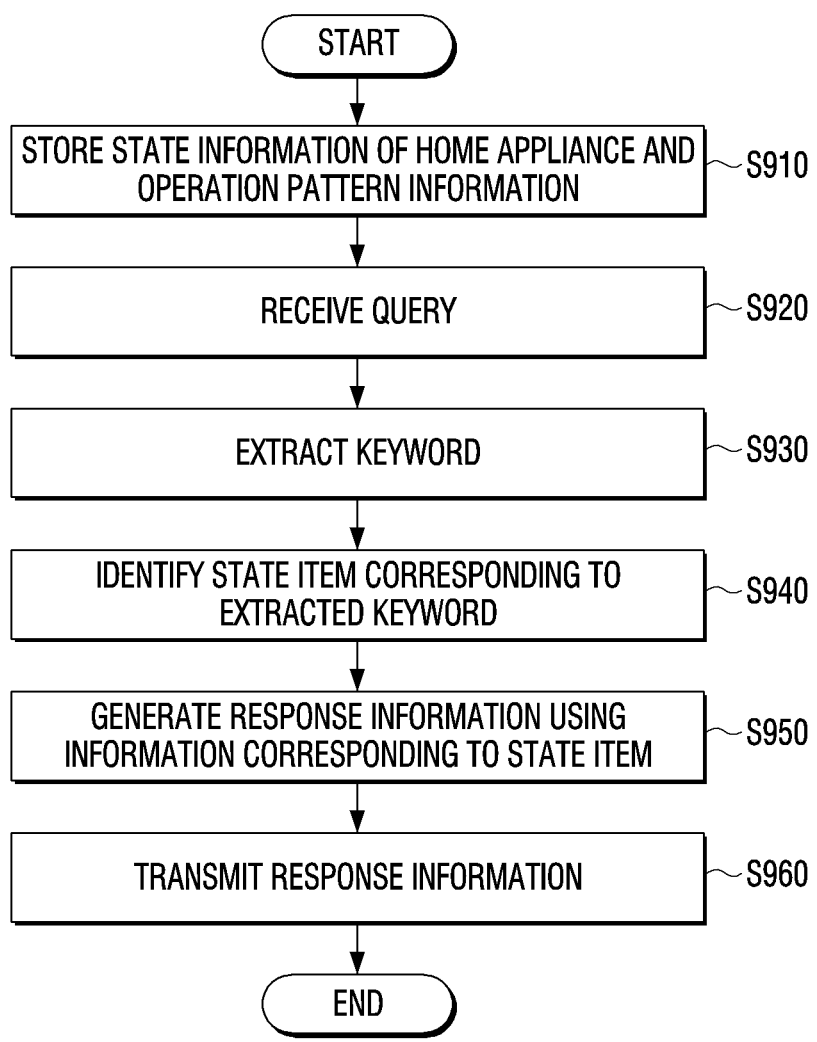
FIG. 9 is a flowchart illustrating a method for managing a home appliance by a server according to an embodiment.

FIG. 9 is a flowchart illustrating a method of managing home appliances by a server according to an embodiment of the disclosure.

Referring to FIG. 9, state information and operation pattern information of the home appliance are stored (S910).

Specifically, state information of the home appliance may be received from the home appliance. The state information is information necessary to check the overall state of the home appliance 100, such as device information, operation history information, set value information, sensing information of sensors in the home appliance, and system parameter information, but is not limited to the above-described example.

In addition, operation pattern information may be generated by using the state information received from the home appliance. Alternatively, operation pattern information generated based on the state information may be received from the home appliance. In addition, the received state information and operation pattern information may be stored.

If state information or operation pattern information is received from each of the plurality of home appliances, state information and operation pattern information for each of the plurality of home appliances may be stored.

A query for the home appliance is received from the terminal device (S920). Specifically, a query including text input by the user may be received through an input device of the terminal device or the display displaying the user interface window. Alternatively, a query including text corresponding to the user's uttered voice sensed through a microphone of the terminal device may be received. Here, the text included in the query may be text corresponding to a question that the user has about the home appliance. In addition, the query may further include device information of the home appliance.

A keyword may be extracted from the text included in the received query (S930). Specifically, a keyword may be extracted by comparing a pre-stored keyword list with text included in the query. Alternatively, keywords may be extracted using a natural language processing (NLP) artificial intelligence model.

At least one state item corresponding to the extracted keyword may be checked (S940). Specifically, it is possible to check at least one state item corresponding to the extracted keyword among the state items corresponding to each of the plurality of pre-stored keywords. Here, the state item may refer to an item of state information and operation pattern information.

Alternatively, at least one state item corresponding to the keyword extracted using the artificial intelligence model may be checked.

In addition, response information may be generated based on information corresponding to at least one state item identified in the state information and operation pattern information of the home appliance (S950).

Specifically, response information including information related to the current state of the home appliance, error information on the home appliance, information on a method of solving an error in the home appliance, information of using home appliances, or the like may be generated.

If the server includes state information and operation pattern information of each of the plurality of home appliances, it is possible to check the home appliance corresponding to the received query among the plurality of home appliances. Specifically, it is possible to check the corresponding home appliance by using the device information of the home appliance included in the query. In addition, response information may be generated based on information corresponding to at least one of the identified state information and operation pattern information of the home appliance.

The generated response information may be transmitted to the terminal device (S960).

Meanwhile, even if the query is not received from the terminal device, it may be possible to check whether the home appliance has an error based on the state information and operation pattern information of the home appliance. Specifically, it may be possible to check whether a specific error is currently occurring in the home appliance or whether a specific error is expected to occur based on the state information and operation pattern information of the home appliance.

If a specific error occurs or is expected to occur in the home appliance, error information may be transmitted to the terminal device.

Meanwhile, the user may input a control command for the home appliance in addition to a question about the home appliance through the terminal device. Accordingly, a control command may be included in the query received from the terminal device.

In this case, a keyword may be extracted from text included in the query, and when a word corresponding to the control command is included in the extracted keyword, the corresponding control command may be transmitted to the home appliance.

In addition, when feedback corresponding to the control command transmitted from the home appliance is received, response information including the received feedback information may be generated. Here, the feedback information means information indicating whether a function corresponding to the control command is performed. Specifically, the feedback information may include information indicating that the function is normally performed when the home appliance starts or finishes performing a function corresponding to the control command. Meanwhile, when the home appliance fails to perform the function corresponding to the control command, information indicating that the function is abnormally terminated or failed may be included.

In addition, response information including the received feedback information may be transmitted to the terminal device.

Accordingly, the home appliance management method of the server may analyze text corresponding to an inquiry input by the user through a terminal device, and generate response information based on state information and operation pattern information of the home appliance corresponding to the analysis result. Accordingly, the user convenience may be increased because a detailed description of the home appliance is not required, and feedback suitable for the current state of the home appliance may be provided. The control method of FIG. 9 may be performed on the server having the constitution of FIGS. 3 and 4, or on another server having different constitution.

In addition, the above-described controlling method may be realized as at least one execution program to execute the above-described controlling method, and such an execution program may be stored in a non-transient computer-readable recording medium.

A non-transitory computer readable medium may refer to a machine-readable medium or device that stores data semi-permanently and not for a short period of time, such as a register, cache, memory, and the like. Specifically, the above-mentioned various applications or programs may be stored in a non-temporal recordable medium such as a CD, DVD, hard disk, Blu-ray disk, USB, memory card, and ROM and provided therein.

Figure 10:
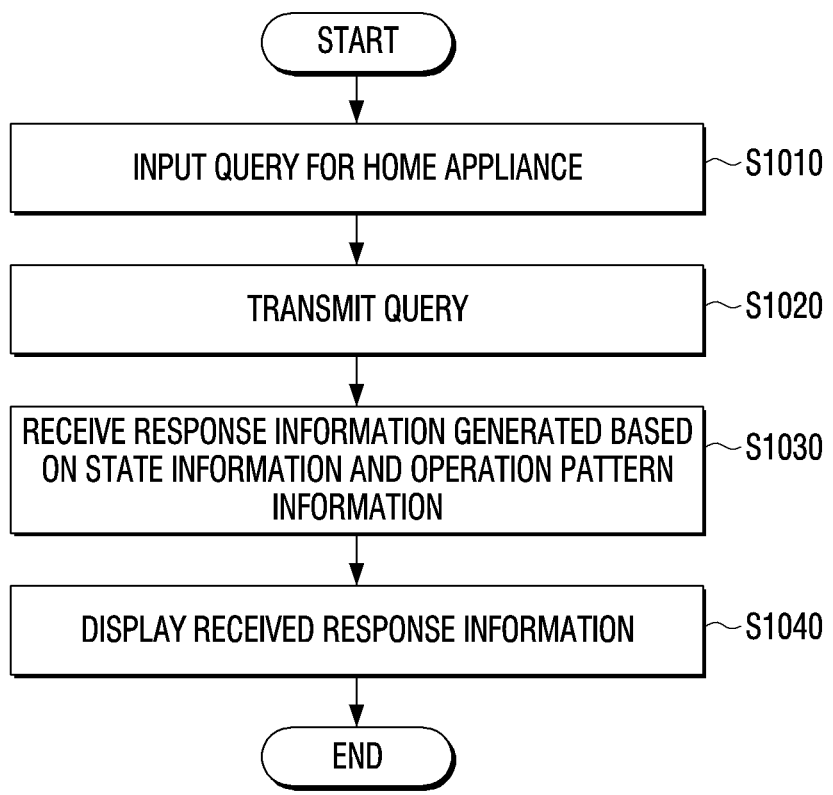
FIG. 10 is a flowchart illustrating a method of managing a home appliance by a terminal device according to an embodiment.

FIG. 10 is a flowchart illustrating a method of managing a home appliance by a terminal device according to an embodiment of the disclosure.

Referring to FIG. 10, a query for a home appliance may be input based on text (S1010). Specifically, a query for the home appliance may be inputted based on text from the user through a user interface window of the display or an input device. Alternatively, the user's uttered voice may be sensed through a microphone, and text corresponding to the user's uttered voice may be input.

The received query may be transmitted to the server (S1020). The transmitted query may include device information about the home appliance.

Response information corresponding to the query transmitted from the server may be received (S1030). The received response information may include not only information related to the current state of the home appliance, but also error information occurring in the home appliance, information on a method of solving an error occurred in the home appliance 100, information on a method of using the home appliance, or the like. In addition, the described information included in the response information may include text, images, or images.

The response information is information generated by the server, and is information by extracting a keyword from the text included in the query received by the server, checking at least one state item corresponding to the extracted keyword, and using information corresponding to at least one state item in the state information and operation pattern information of home appliances.

The received response information may be displayed (S1040). Specifically, response information received from the server through the chat application displayed on the user interface window of the display may be displayed in a text, image, or video format.

Meanwhile, the user may input a control command for the home appliance in addition to a question about the home appliance through the terminal device. Accordingly, a control command may be included in the query received from the terminal device.

In this case, the query including the control command input to the server may be transmitted. In addition, response information including feedback information corresponding to the control command may be received from the server. In addition, the received feedback information may be displayed.

Accordingly, the home appliance management method of the terminal device of the disclosure analyzes text corresponding to an inquiry input by the user through the terminal device, and generate response information based on state information and operation pattern information of the home appliance corresponding to the analysis result, and thus user convenience may be increased since it does not require the user's detailed description of the home appliance, and feedback suitable for the current state of the home appliance may be provided. The control method as illustrated in FIG. 10 may be executed on the terminal device having the configuration of FIG. 5, and may be executed on a terminal device having other configurations.

In addition, the above-described controlling method may be realized as at least one execution program to execute the above-described controlling method, and such an execution program may be stored in a non-transient computer-readable recording medium.

The foregoing exemplary embodiments and advantages are merely exemplary and are not to be construed as limiting the disclosure. The present teaching can be readily applied to other types of apparatuses. Also, the description of the exemplary embodiments of the disclosure is intended to be illustrative, and not to limit the scope of the claims, and many alternatives, modifications, and variations will be apparent to those skilled in the art.

What is claimed is:

1. A server comprising:
    a communication device configured to perform communication with a home appliance and a terminal device;
    a memory configured to store state information of the home appliance and operation pattern information obtained by analyzing an operation pattern of the home appliance based on a plurality of state information stored in a time series of the home appliance; and
    a processor configured to, based on a query for the home appliance being received from the terminal device, generate response information in response to the received query and control the communication device to transmit the generated response information to the terminal device,
    wherein the processor is configured to extract a keyword included in the received query, check at least one state item corresponding to the extracted keyword, and generate the response information by using information corresponding to the at least one state item in the state information and the operation pattern information,
    wherein the received query is configured to include text input by a user through the terminal device, wherein the processor is configured to extract the keyword from the text in the query by using an artificial intelligence model that is a natural language processing model, wherein the processor is configured to, based on a word corresponding to a control command being included in the keyword extracted from the text in the query, control the communication device to transmit the control command to the home appliance, based on feedback information for the transmitted control command being received from the home appliance, generate the response information, the response information including the received feedback information, and control the communication device to transmit the response information including the received feedback information to the terminal device.

2. The server of claim 1, wherein the processor is configured to receive the state information from the home appliance, and update the operation pattern information by using the received state information.

3. The server of claim 1, wherein the state information is configured to include at least one of device information, operation history information, set value information, sensing information of a sensor in the home appliance, and system parameter.

4. The server of claim 1, wherein the memory is configured to store state information and operation pattern information of each of a plurality of home appliances, and
wherein the processor is configured to check a home appliance in response to the received query among the plurality of home appliances, and generate the response information based on the state information and the operation pattern information corresponding to the checked home appliance.

5. The server of claim 1, wherein the processor is configured to check whether the home appliance has an error by using the stored state information and the operation pattern information, and control the communication device to transmit information on the error to the terminal device.

6. A method for managing home appliances comprising:
storing state information of the home appliance and operation pattern information obtained by analyzing an operation pattern of the home appliance;
receiving a query for the home appliance from a terminal device;
generating response information in response to the received query; and
transmitting the generated response information to the terminal device;
wherein generating the response information includes:
extracting a keyword included in the received query;
checking at least one state item corresponding to the extracted keyword; and
generating the response information by using information corresponding to the at least one state item in the state information and the operation pattern information,
wherein the operation pattern information comprises information on a user's preferences regarding operating the home appliance determined by analyzing operation patterns of the home appliance based on the stored state information of the home appliance,
wherein the received query is configured to include text input by a user through the terminal device,
wherein extracting the keyword includes extracting the keyword from the text in the query by using an artificial intelligence model that is a natural language processing model,
wherein generating the response information further includes:
based on a word corresponding to a control command being included in the extracted keyword, transmitting the control command to the home appliance; and
based on feedback information for the transmitted control command being received from the home appliance, generating the response information including the received feedback information, and
wherein transmitting the generated response information to the terminal device includes transmitting the response information including the received feedback information to the terminal device.

7. The method of claim 6, further comprising:
receiving the state information from the home appliance, and updating the operation pattern information by using the received state information.

8. The method of claim 6, wherein the state information is configured to include at least one of device information, operation history information, set value information, sensing information of a sensor in the home appliance, and system parameter.

9. The method of claim 6, wherein storing the state information of the home appliance includes storing state information and operation pattern information of each of a plurality of home appliances, and
Wherein generating the response information further includes checking a home appliance in response to the received query among the plurality of home appliances, and
Wherein generating the response information by using information corresponding to the at least one state item includes, based on the state information and the operation pattern information corresponding to the checked home appliance, generating the response information.

* * * * *